United States Patent

[11] 3,604,096

| [72] | Inventor | Yoshiaki Shiroma<br>840 W. Maripasa, Santa Maria, Calif. 93454 |
|---|---|---|
| [21] | Appl. No. | 813,962 |
| [22] | Filed | Apr. 7, 1969 |
| [45] | Patented | Sept. 14, 1971 |

[54] SEAL RING APPLICATOR
1 Claim, 5 Drawing Figs.

| [52] | U.S. Cl. | 29/235 |
|---|---|---|
| [51] | Int. Cl. | B23p 19/08 |
| [50] | Field of Search | 29/222, 229, 235, 235.5 |

[56] References Cited
UNITED STATES PATENTS

| 746,262 | 12/1903 | Gillies | 29/235 X |
|---|---|---|---|
| 1,303,614 | 5/1919 | Swart | 29/222 |
| 1,319,297 | 10/1919 | Limacher | 29/235.5 |
| 3,319,325 | 5/1967 | Nessamar | 29/235 |
| 3,305,920 | 2/1967 | Massey | 29/222 |

*Primary Examiner*—Robert C. Riordon
*Assistant Examiner*—J. C. Peters
*Attorney*—Harris, Kiech, Russell & Kern ABSTRACT: A generally round, axially parted, thin-walled device with a substantially cylindrical section optionally interrupted by axial slits upon which to mount the seal and a flared frustoconical section at one end thereof.

PATENTED SEP 14 1971
3,604,096
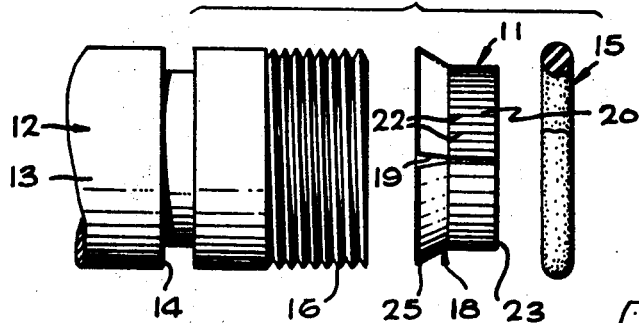
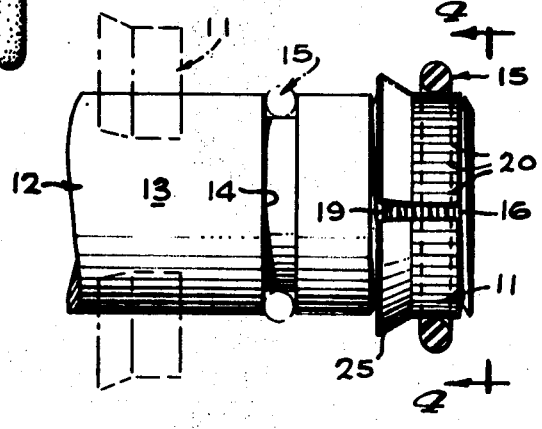
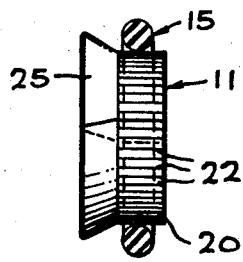
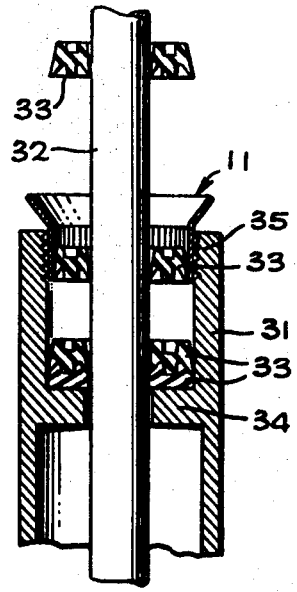
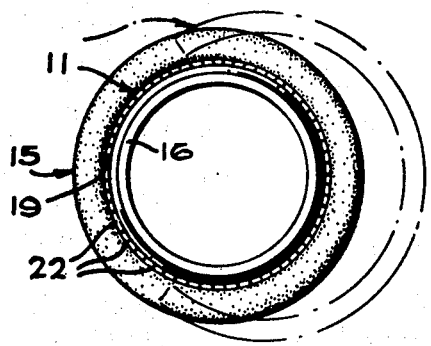
INVENTOR.
YOSHIAKI SHIROMA
BY
Mason & Graham
ATTORNEYS

SEAL RING APPLICATOR

The installation of seal rings formed of resilient and elastic material, such as O-rings and the like, gives rise to some difficulty because the rings often have to be installed over a surface of greater diameter than the internal diameter of the ring in order to reach the ring groove or other site where the ring is to be placed. Often, too, the surface over which the ring must be passed is threaded, rough or characterized by sharp edge portions which can easily damage a ring which is forced thereover. While O-rings can frequently be rolled over an intervening surface to a ring groove, this is difficult and not practicable with rings of other cross-sectional shapes such as are often used in present-day installations. Also, there is always the problem of expanding the ring sufficiently to pass over a portion of the shaft or fitting of greater diameter than the internal diameter of the ring before the ring can be seated in its groove. Similar difficulties arise in connection with the installation of seal rings within cylindrical bodies where the outer diameter of the ring is greater than the inner diameter of a passage through which the ring must be moved to seal it in its groove.

It is therefore an object of the invention to provide a novel applicator which overcomes the usual difficulties of installing seal rings pointed out above and which enables a person to easily and quickly install a ring without any likelihood of damaging it.

Another object is to provide a simple, one-piece expansible-contractible applicator upon which a seal ring can be readily mounted by hand and embodying a flared portion at one end adapted initially to engage the object over which the ring must be installed and so designed that as the applicator is moved axially against the end of the object, it and the seal ring thereon are expanded to the necessary diameter.

Still another object is to provide a simple, inexpensive, easy-to-use applicator which can be readily removed from the shaft or other object after the ring is installed and which is reusable for the installation of other rings.

A further object is to provide an applicator for the installation of seal rings within a confining cylindrical body or the like.

In summary, it is an object to provide an applicator with an annular body, parted axially, having a substantially cylindrical section for mounting a sealing ring and a flared portion at one end thereof and optionally with the sealing ring mounting section interrupted by a plurality of axial slits or narrow slots.

These and other objects will be apparent from the drawing and the following description. Referring to the drawing:

FIG. 1 is an exploded view showing an applicator embodying the invention between a seal ring and a member to which the seal ring is to be applied;

FIG. 2 is a sectional elevational view of the applicator with the seal ring thereon;

FIG. 3 is a view showing the seal ring and applicator on the member to which the seal ring is to be applied but short of the seal ring groove, with the seal broken away;

FIG. 4 is an end elevational view on line 4—4 of FIG. 3; and

FIG. 5 is a view illustrating the installation of seal rings inside a cylinder around a shaft, the cylinder, rings and an applicator being shown in section.

More particularly describing the invention, the applicator is generally designated by numeral 11 and in FIGS. 1 and 3 there is shown an end portion of a pin or shaft designated 12 which has a cylindrical main body 13 which is interrupted by a peripheral groove 14 designed to receive a resilient elastic seal ring, such as the O-ring designated 15. Member 12 is shown provided with a threaded end portion 16 over which the seal ring must be applied to reach the ring groove.

The seal ring applicator 11 comprises a generally annular body 18 which is interrupted or parted axially at 19. The applicator has a seal ring mounting section 20 shown as being a substantially cylindrical ring preferably provided with a plurality of axially extending slits 22. The slits 22 may be evenly spaced circumferentially around the mounting section and interrupt the continuity of the section from the rear edge 23 forward across its width. At its forward end the application is formed to provide a flared annular flange designated 25. The flange 25 is formed as a continuation of the seal ring mounting section 20 and preferably is frustoconical in shape as shown.

In the use of the applicator, the seal ring 15 is placed around the seal ring mounting section 20 by collapsing the applicator through overlapping the ends thereof sufficiently for the purpose, as shown in FIG. 2. The assembled applicator and seal ring are then moved axially with the flared end foremost against the end of the member 12 upon which the seal ring is to be installed and the applicator is expanded due to the camming action of the interior surface of the flared flange against the end of member 12. Once the assembly is on the member 12 it can be readily moved over any rough or other portions of the object from the position of FIG. 3 to a position just beyond the ring groove 14 where the seal ring can be removed from the applicator and placed in the groove. The applicator may then be removed radially of the object 12 by expanding it, if desired, as shown in broken lines in FIG. 3.

The various slits 22, which might be narrow slots, lend flexibility to the device, however, they are not absolutely essential. The applicator may be made of metal, plastic or other suitable material.

Referring now to FIG. 5, an applicator 11 is shown inserted in the end of a cylinder 31 31 through which a shaft 32 extends. Seal rings 33 are to be installed between the parts against the internal flange 34 and held in place by a retaining nut (not shown) which will be threaded into the threaded section 35 of the cylinder. Seal rings or packing rings 33, which are mounted on the shaft 32 in the manner previously described, are readily inserted in the cylinder and past the threaded portion thereof by utilizing an applicator 11 at the end of the cylinder as shown through which the seals can be pushed.

I claim:

1. A seal ring applicator for seating O-type sealing rings in cylindrical seats in and around shafts, pins, and the like, comprising:

a flexible, thin-walled, axially parted, cylindrical ring including a plurality of circumferentially spaced axially extending slits and having an outer surface for receiving and supporting an O-ring to be seated in a cylindrical seat in or around a shaft or the like; and a flexible, thin-walled, outwardly flaring substantially frustoconical flange extending from a forward end of and continuous with said cylindrical ring for limiting forward travel of said O-ring on said cylindrical ring, said flange being axially parted in line with said cylindrical ring and having an outwardly inclined inner surface for bearing against an end of said shaft to expand said cylindrical ring as it is moved forward thereover to deposit said O-ring in said seat.